United States Patent
Lum et al.

(10) Patent No.: US 11,677,549 B2
(45) Date of Patent: Jun. 13, 2023

(54) MAINTAINING CONFIDENTIALITY IN DECENTRALIZED POLICIES

(71) Applicant: International Business Machines Corporation, Armonk, NY (US)

(72) Inventors: Jia Jun Brandon Lum, Yorktown Heights, NY (US); Mariusz Sabath, Ridgefield, CT (US); Alaa S. Youssef, Valhalla, NY (US)

(73) Assignee: International Business Machines Corporation, Armonk, NY (US)

(*) Notice: Subject to any disclaimer, the term of this patent is extended or adjusted under 35 U.S.C. 154(b) by 66 days.

(21) Appl. No.: 17/218,090

(22) Filed: Mar. 30, 2021

(65) Prior Publication Data
US 2022/0321335 A1 Oct. 6, 2022

(51) Int. Cl.
*H04L 9/08* (2006.01)

(52) U.S. Cl.
CPC .................. *H04L 9/0861* (2013.01)

(58) Field of Classification Search
CPC ..................................... H04L 9/0861
See application file for complete search history.

(56) References Cited

U.S. PATENT DOCUMENTS

| 7,577,838 | B1 | 8/2009 | Rossmann |
| 8,925,075 | B2 | 12/2014 | Krendelev |
| 10,033,708 | B2 | 7/2018 | Raykova |
| 10,263,787 | B1* | 4/2019 | Gelman ............... G06F 21/335 |
| 10,296,709 | B2 | 5/2019 | Laine |
| 2013/0086645 | A1* | 4/2013 | Srinivasan ........... H04L 9/3234 726/4 |
| 2013/0097417 | A1 | 4/2013 | Lauter |
| 2013/0254850 | A1* | 9/2013 | Alison ............... H04L 63/0884 726/4 |
| 2014/0075568 | A1* | 3/2014 | Sathyadevan ......... G06F 21/554 726/27 |
| 2014/0233727 | A1 | 8/2014 | Rohloff |
| 2017/0132621 | A1* | 5/2017 | Miller .................. H04L 9/0637 |

(Continued)

FOREIGN PATENT DOCUMENTS

| AU | 2013277948 B9 | 2/2018 |
| CN | 102833346 B | 12/2012 |

(Continued)

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

*Primary Examiner* — Darshan I Dhruv
(74) *Attorney, Agent, or Firm* — Haley J. McClory

(57) ABSTRACT

A processor may generate one or more encrypted policies associated with a policy creator. A processor may generate token metadata associated with a user utilizing the one or more encrypted policies. A processor may encrypt the token metadata to form encrypted token metadata. A processor may send the one or more encrypted policies and the encrypted token metadata to a policy evaluator. The policy evaluator may evaluate the one or more encrypted policies and the encrypted token metadata. The processor may return a response. The response may be based on the evaluation by the policy evaluator.

17 Claims, 5 Drawing Sheets

(56) References Cited

U.S. PATENT DOCUMENTS

| | | | | |
|---|---|---|---|---|
| 2017/0237747 A1* | 8/2017 | Quinn | ............... | G06F 21/602 |
| | | | | 726/29 |
| 2018/0183586 A1* | 6/2018 | Bhargav-Spantzel | ...................... | |
| | | | | G06F 21/32 |
| 2020/0177637 A1* | 6/2020 | Narayanaswamy | .. | H04L 63/104 |

FOREIGN PATENT DOCUMENTS

| | | | | | |
|---|---|---|---|---|---|
| CN | 104935608 A | * | 9/2015 | | |
| CN | 106650205 B | | 5/2017 | | |
| CN | 108880863 A | | 11/2018 | | |
| CN | 112187931 A | * | 1/2021 | | |
| GB | 2413864 A | | 11/2004 | | |
| WO | 2018136804 A1 | | 7/2018 | | |
| WO | 2018136811 A1 | | 7/2018 | | |
| WO | WO-2020132012 A1 | * | 6/2020 | ........... | G06F 21/121 |

\* cited by examiner

MAINTAINING CONFIDENTIALITY IN DECENTRALIZED POLICIES

BACKGROUND

The present disclosure relates generally to the field of decentralized policies, and more particularly to methods and techniques for maintaining privacy and ensuring confidentiality of a user's information associated with decentralized policies.

Data privacy has become a growing concern over the last decade as technology advances in data mining has allowed large portions of personal data to be collected. Often, in decentralized policies, data unrelated to performing a particular policy function (e.g., a policy holder's identity) may be shared with actors that do not have the same level of trust as the policy issuer. As such, methods and techniques that ensure personal, private information, remains confidential are desired.

SUMMARY

Embodiments of the present disclosure include a method, computer program product, and system for preserving confidentiality of metadata in decentralized policies. A processor may generate one or more encrypted policies associated with a policy creator. A processor may generate token metadata associated with a user utilizing the one or more encrypted policies. A processor may encrypt the token metadata to form encrypted token metadata. A processor may send the one or more encrypted policies and the encrypted token metadata to a policy evaluator. The policy evaluator may evaluate the one or more encrypted policies and the encrypted token metadata. The processor may return a response. The response may be based on the evaluation by the policy evaluator.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
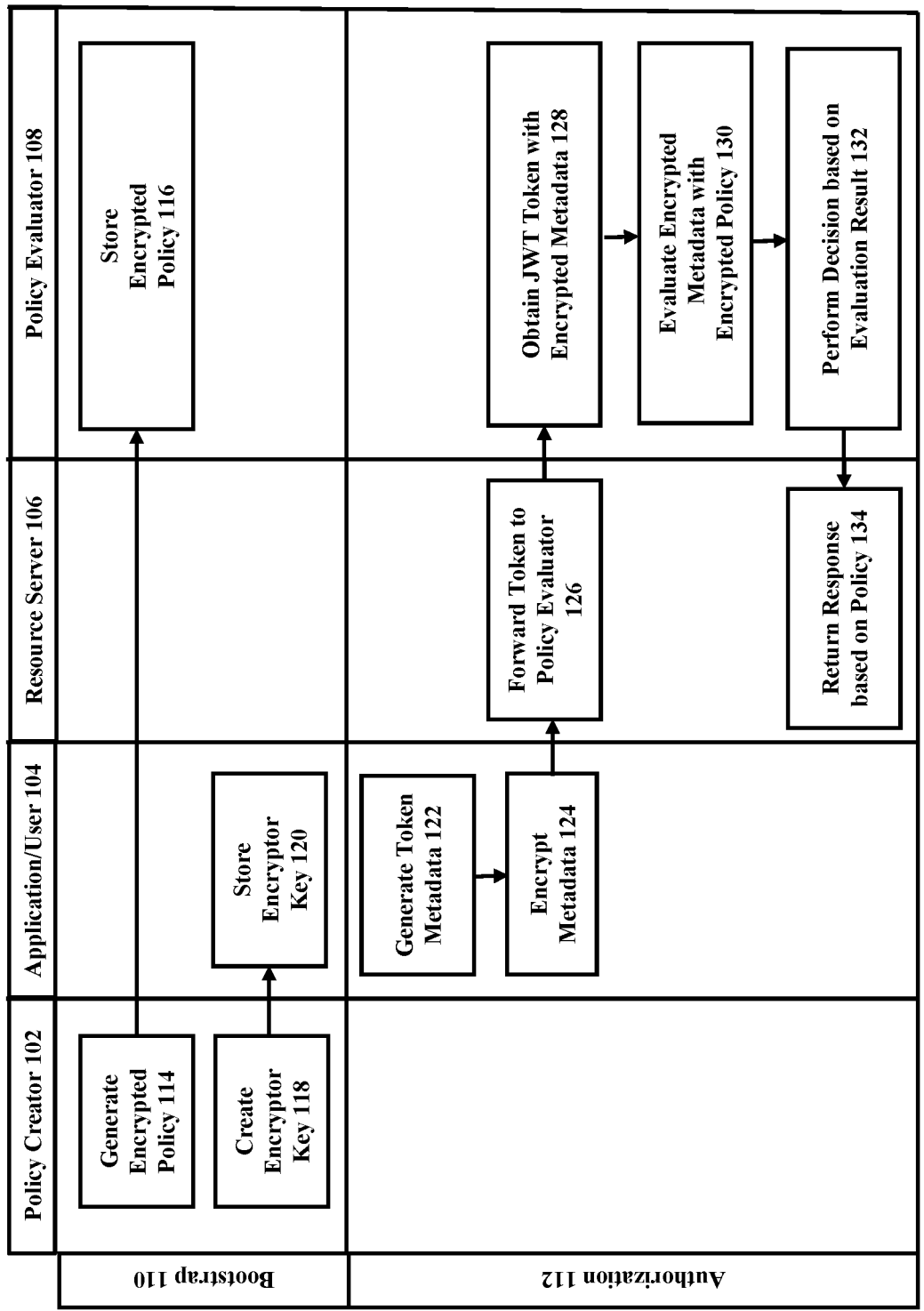
FIG. 1 illustrates a block diagram of a system for preserving confidentiality of metadata in decentralized policies, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present disclosure relates generally to the field of decentralized policies, and more particularly to methods and techniques for maintaining privacy and ensuring confidentiality of a user's information associated with decentralized policies. While the present disclosure is not necessarily limited to such applications, various aspects of the disclosure may be appreciated through a discussion of various examples using this context.

Often, a control plane or third-party cloud provider may manage the policy services of various policy holders in decentralized policy management configurations. In such configurations, the control plane managing the service cannot be fully trusted. Typically, control planes are managed by the third-party companies and their employees. Those third parties, or anyone with access to the policy services might be able to see orchestration components and their metadata of the policy. Often these third parties are not be certified to access this data/information and may be lacking specific compliance requirements. As a result, there is only certain level of trust that may be assigned to the control plan. For example, Software as a Service authorization is usually based on a token describing a person or a service. When a policy holder (e.g., user or administrator) makes a call or inquiry regarding a particular policy to the control plane, the policy holder must provide some private details/data or attributes (e.g., metadata) that describe and verify the policy holder's identity to ensure they are authorized to access the policy. These private details/data may include, but are not limited to, the policy holder's address, customer identification number, and company or product name.

These private details, because they are not widely known, may be matched against the information listed in the policy to prevent unauthorized parties from accessing data or secrets configured within the policy. Depending on how a policy is structured, the private details/data needed to verify an authorized user/policy holder to access specific information or objects in a policy might be tied closely to the specific identity private details or attributes. In policy-based decision making, a control plane may be processing various private details or attributes, that might be a sensitive nature (e.g., that the policy holder may desire to remain confidential). If these private details/attributes are encrypted for the duration the control plan has access to them (e.g., during decision making process) such private details/attributes can remain confidential and secure. This may be particularly beneficial during the authorization process where the private details/attributes are matched against information provided in the policies. For example, the authorization process may be managed by a provider (e.g., external authentication), who may be lacking the compliance requirements (e.g., those requirements that may be in imposed by a government agencies, such as the National Institute of Standards and Technology), or might not be certified to see the private details/attributes associated with the policy hold's policy query. As such, there is a need for methods and techniques that provide policy issuers the ability to have finer control over private details/attributes that ensure this data remains confidential or private.

In embodiments discussed herein, are solutions provided in the form of a method, system, and computer program product for preserving confidentiality of metadata in decentralized policies. Embodiments contemplated herein preserve a policy holder's confidentiality of metadata (e.g., private details/attributes) in decentralized policies. Preserving a policy holder's confidentiality can ensure the anonymity of the policy holder's customers, protect subscription details associated with the policy holder or their customers, or any other information that might be associated with a particular policy.

In embodiments, a processor may be configured to generate one or more encrypted policies (e.g., encrypted with homomorphic encryption) associated with a policy creator. A policy creator may include any person or entity (e.g., policy issuer) who configures or defines the policy. In embodiments, a policy creator may have access to one or more policies and the associated metadata (e.g., private details/attributes) associated with the policy holder (e.g., user, administrator, application/application software, etc.). In embodiments, policy creators are considered fully trusted parties within the decentralized policy management configuration.

In embodiments, a processor may generate a token metadata of the metadata associated with a user/application utilizing the one or more encrypted policies. By tokenizing the metadata, the private details/attributes found within the metadata may be converted into a random string of characters (e.g., a token). This random string of characters may make reference to the original data, but the random string of characters can often not be reverse engineered.

In embodiments, a processor may encrypt the token metadata to form encrypted token metadata. By encrypting the token metadata any third party, or unauthorized person/process may be prevented from reading the metadata. While any type of encryption process may be used, in some embodiments, a homomorphic encryption may be used to encrypt the token metadata. In some embodiments, a processor may configure the encrypted token metadata into a JSON web token (JWT token). JWT tokens is a method of encapsulating information, that is often easily read but cannot be tampered with. JWT tokens usually include public key information and the payload. For example, if the payload of the token is modified, it would not match the signature.

While in some embodiments, a processor may send the one or more encrypted policies and the encrypted token metadata directly to a policy evaluator, in other embodiments, a resource server (e.g., a server that serves a particular purpose) may pass the one or more encrypted policies and the encrypted token metadata to the policy evaluator. A resource server may be configured to manage one or more different resources including, but not limited to, storage, CPU, memory, container, networking, or any combination thereof. In some embodiments, in order to provision a resource in the most optimal way, the service might need to request some additional information about the application of this resource. This information might contain specific metadata that must be encrypted.

In embodiments, the policy evaluator (e.g., an engine) may determine policy actions associated with the one or more encrypted policies. The policy evaluator could be any party within the decentralized policy management configuration lacking complete trust (e.g., missing confidentiality certificate). In some embodiments, the policy evaluator, and other parties lacking trust, may not have access to metadata associated with the user/application. In some embodiments, the policy evaluator may obtain the JWT token. In some embodiments, the policy evaluator may be configured to store the one or more encrypted policies generated by a policy creator.

In embodiments, the policy evaluator may evaluate the one or more encrypted policies and the encrypted token metadata. In some embodiments, the policy evaluator may determine an evaluation result. In these embodiments, the evaluation result may be based on the evaluation of the one or more encrypted policies and the encrypted token metadata by the policy evaluator. In these embodiments, the policy evaluator may perform a decision based on the evaluation result.

In embodiments, responsive to evaluating the one or more encrypted policies and the encrypted token metadata, a response (e.g., could be as simple as a true/false response) may be generated/returned based on determining an evaluation result. For example, a processor may determine if resource Y, who has attributes A, B, C, and D, get access to the resource X (e.g., evaluation result) and generate a response of yes or no. In these embodiments, the evaluation result may be based, at least in part, on the evaluation of the one or more encrypted policies and the encrypted token metadata by the policy evaluator. In embodiments, the policy evaluator may perform a decision based, at least in part, on the evaluation result. In these embodiments, a processor may forward the evaluation result to a resource server. In these embodiments, the resource server may generate the response and may return the response to the user/application.

In one example embodiment, medical application software (e.g., application) may need resources, provided by a resource server, to render a medical simulation. The configuration of the resource server, or size of resources (e.g., CPU, memory, storage, and/or number of containers) and duration of time necessary to render the simulation (e.g., process the data) may depend on the number of test cases for a specific group of patients in a particular county. In this example, regulations in the particular county require that all patient data be processed within a datacenter in the particular county. In this example embodiment, a request to a policy evaluator could include, given the following patient data, can the following simulation be rendered and, if so, how many resources will be required, assuming the following set of policies. In this example, a response to the above request could be, that resources A, B, and C are available for the next two hours.

Referring now to FIG. 1, a block diagram 100 of a system for preserving confidentiality of metadata in decentralized policies, is depicted in accordance with embodiments of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, system for preserving confidentiality of metadata in decentralized policies (e.g., system 100) may include actors policy creator 102, application/user 104, resource server 106, and policy evaluator 108. While in some embodiments, system 100 may be separated into the bootstrap 110 and the authorization 112 sections, in other embodiments, some or all of the components contemplated herein may be configured within the bootstrap 110 section or, alternatively, some or all the components configured within authorization 112 section.

In embodiments, bootstrap 110 may include policy creator 102 generating one or more encrypted policies. The one or more policies may be encrypted using any available encryption (e.g., homomorphic encryption). In these embodiments, policy creator 102 may generate an encryptor key 118. Encryptor key 118 may be configured in any form of a key or function that may be utilized in system 100. In some embodiments, policy creator 102 may define the one or more policies that will be encrypted. In these embodiments, policy creator 102 may be configured to have access to metadata (e.g., private details/attributes of a user/application) associated with the one or more encrypted policies.

In embodiments, bootstrap 110 may pass encryptor key 118 to a key encryptor store 120. In some embodiments, a user/application 104 may be configured to store the encryptor key 118 associated with one or more of the user/application 104's policy (e.g., the parties that provide the private details/attributes, such as identity). In embodiments, the one or more encrypted policies generated by policy creator 104 may be stored in an encrypted policy store 116. In these embodiments, encrypted policy store 116 may be managed by policy evaluator 108.

In embodiments, system 100 may include authorization 112 section. In authorization 112 section, a user/application may generate a token metadata of the metadata associated with the one or more encrypted policies of the user/application 104. In these embodiments, the metadata may include identity information or any other information the user/application 104 may desire to be confidential (e.g., private details/attributes). In embodiments, the user/application 104 may encrypt the token metadata with an encryptor to form an encrypted token metadata 124. In some embodiments, the user/application can delegate this responsibility to another component (e.g., Yubikey®) and demonstrate the user/application 104's trust in that component. For example, the user/application may not be able to execute a particular operation due to one or more limitations. For example, in order to comply with specific security requirements, hardware encryption may be required that can only be executed on special hardware. For example, Trusted Platform Module (TPM) may be used or other hardware that may be configured to store cryptographic keys used for encryption. In some embodiments, a security device, such as a hardware security module, may be added to manage, generate, and securely store cryptographic keys.

In embodiments, the user/application 104 may pass the encrypted token metadata 124 to resource server 106. Resource server 106 can be any server associated with a particular purpose. In embodiments, resource server 106 may pass the encrypted token metadata 124 to policy evaluator 108 (e.g., forward token to policy evaluator 126). In some embodiments policy evaluator 108 may obtain encrypted token metadata 124 with a JWT token (e.g., obtain JWT token with encrypted metadata 128). In embodiments, policy evaluator 108 may evaluate the encrypted token metadata against the encrypted policy stored in encrypted policy store 116 (e.g., evaluate encrypted metadata with encrypted policy 130) and may generate an evaluation result. In embodiments, policy evaluator 108 may perform/determine a policy decision, based, at least in part, on the evaluation results (e.g., perform decision based on evaluation result 132). In embodiments, the policy evaluator 108 may forward the decision to the resource server 106. In these embodiments, resource server 106 may determine a response. In these embodiments, after a response is determined by resource server 106, resource server may return the response to the user/application 105 based on the policy (e.g., return response based on policy).

Figure 2:
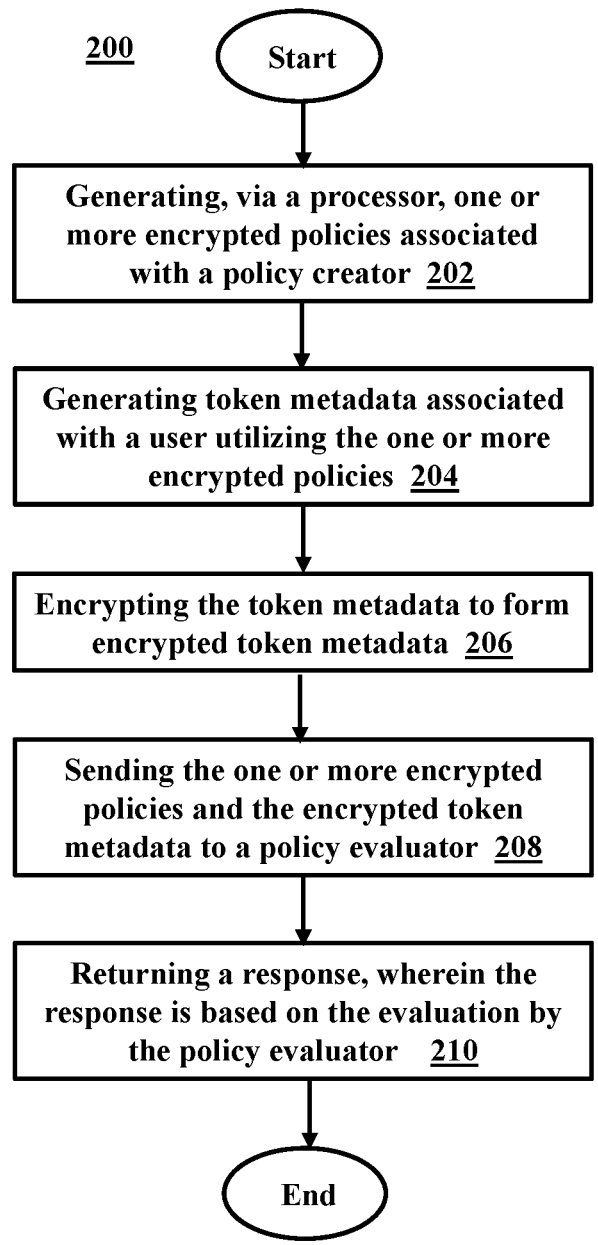
FIG. 2 illustrates a flowchart of a method preserving confidentiality of metadata in decentralized policies, in accordance with embodiments of the present disclosure.

Referring now to FIG. 2, a flowchart illustrating an example method 200 for preserving confidentiality of metadata in decentralized policies, in accordance with embodiments of the present disclosure. In some embodiments, the method 200 begins at operation 202 where a processor generates one or more encrypted policies associated with a policy creator. In some embodiments, operations 202 may be a process included in a bootstrap process, such as bootstrap process 110 in FIG. 1.

In some embodiments, the method 200 proceeds to operation 204. At operation 204, a processor may generate token metadata associated with a user utilizing the one or more encrypted policies. In some embodiments, the method 200 proceeds to operation 206. At operation 206, the processor encrypts the token metadata to form encrypted token metadata.

In some embodiments, the method 200 proceeds to operation 208. At operation 208, the processor may send the one or more encrypted policies and the encrypted token metadata to a policy evaluator. While in some embodiments, the one or more encrypted policies and encrypted token metadata are sent to the policy evaluator at the same time, in other embodiments, the one or more encrypted policies and encrypted token metadata are sent to the policy evaluator at different times. In embodiments, the policy evaluator may evaluate the one or more encrypted policies and the encrypted token metadata.

In some embodiments, the method 200 proceeds to operation 210. At operation 210, the processor may return a response. In embodiments, the response is based on the evaluation by the policy evaluator. In some embodiments, as depicted in FIG. 2, after operation 210, the method 200 may end. In embodiments, operations 204-210 may be processes included in an authorization process, such as authorization process 112 in FIG. 1.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
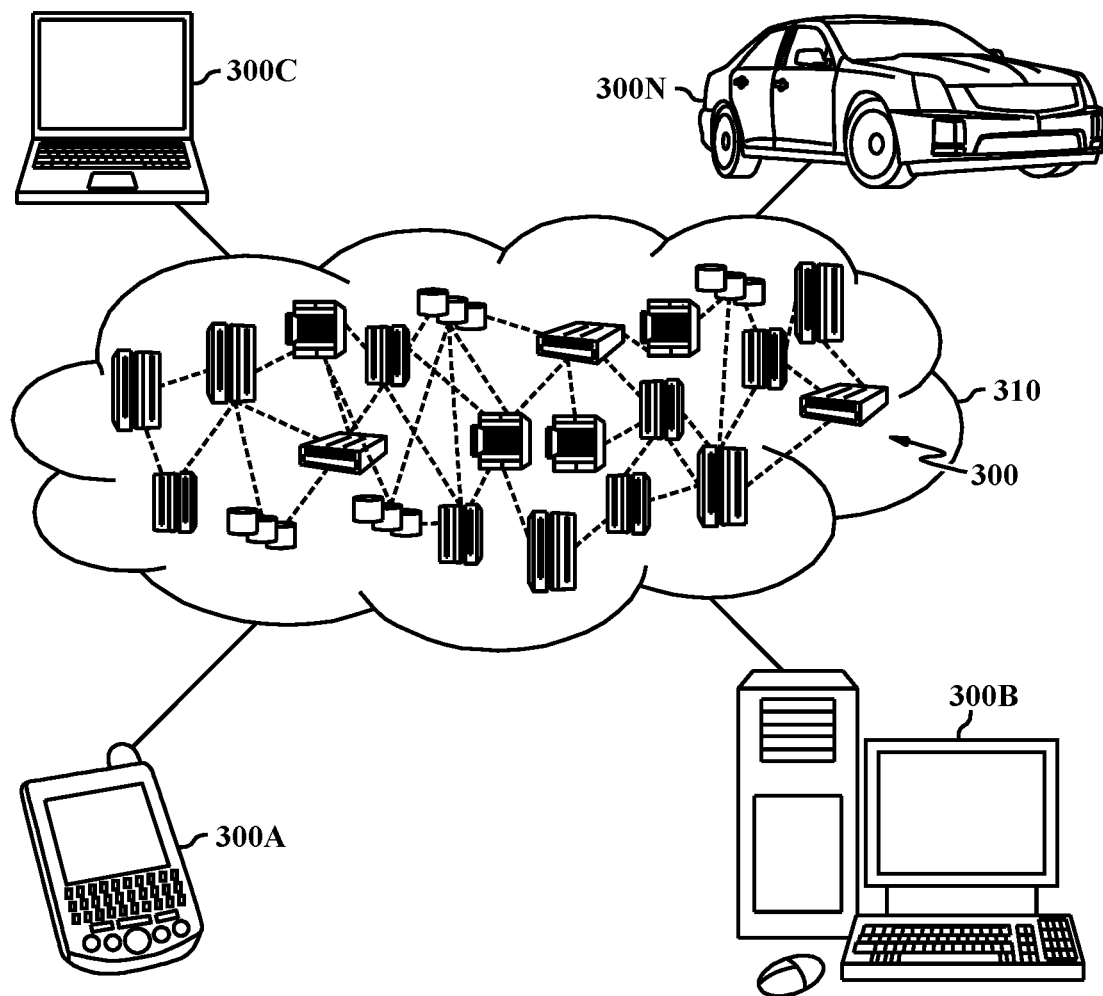
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
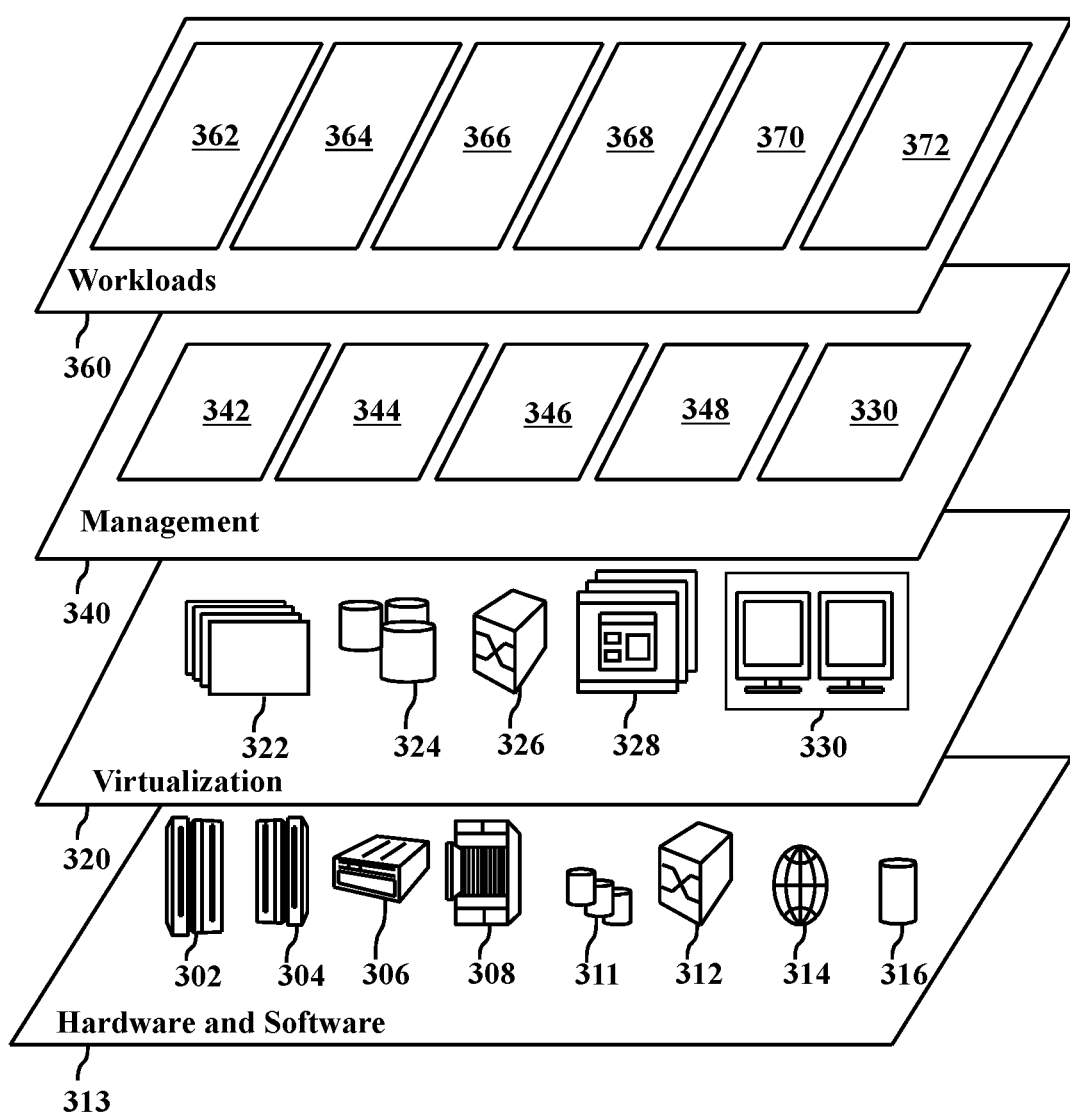
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and preserving confidentiality of metadata in decentralized policies 372.

Figure 4:
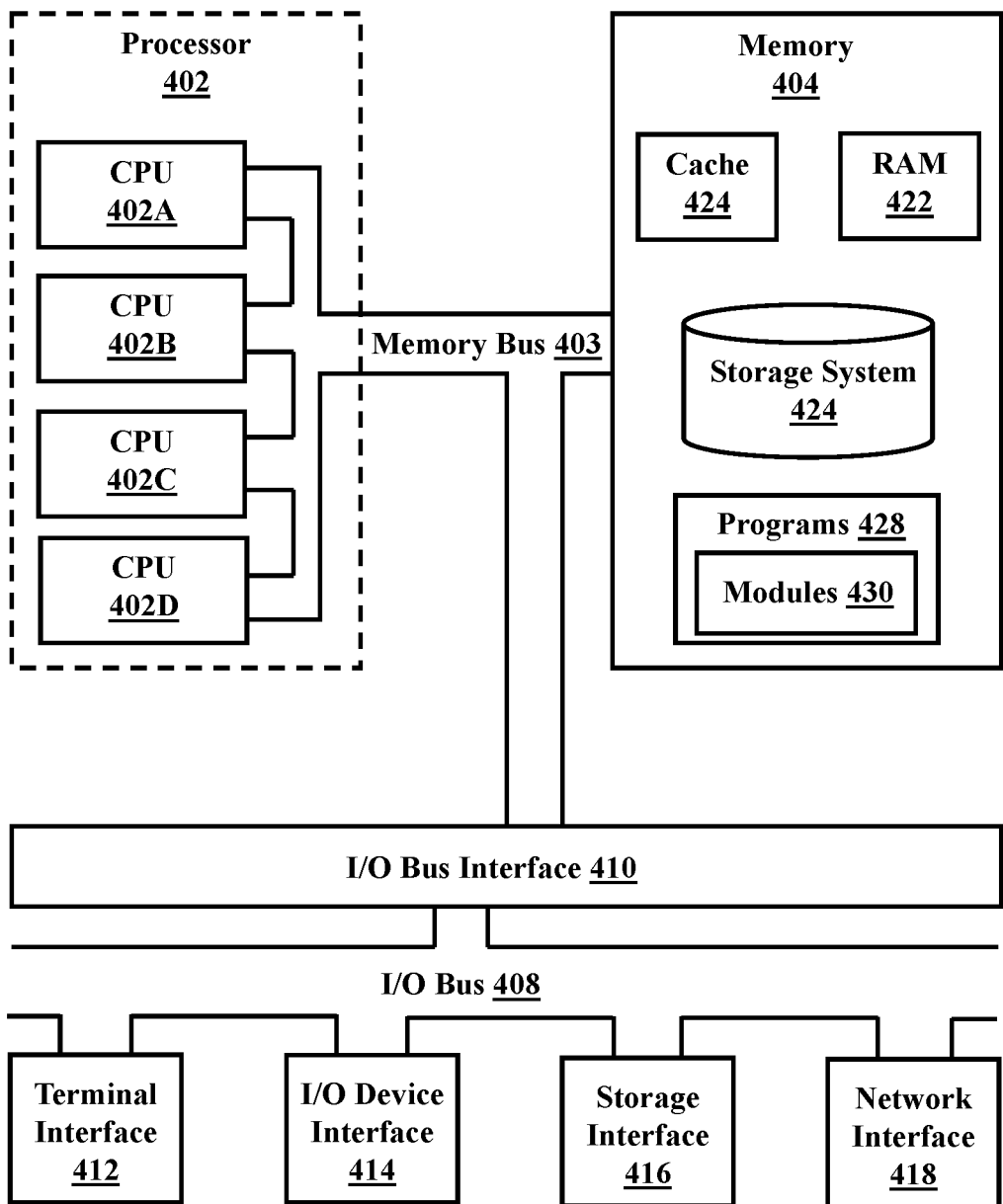
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for preserving confidentiality of metadata in decentralized policies, the method comprising:
   generating, via a processor, one or more encrypted policies associated with a policy creator;
   generating token metadata associated with a user request utilizing the one or more encrypted policies;
   encrypting the token metadata to form encrypted token metadata;
   sending the one or more encrypted policies and the encrypted token metadata to a policy evaluator, wherein the policy evaluator evaluates the one or more encrypted policies and the encrypted token metadata to determine an evaluation result, wherein the evaluation result is based on the evaluation of the one or more encrypted policies and the encrypted token metadata by the policy evaluator;

performing, responsive to determining an evaluation result, a decision based on the evaluation result;

determining one or more security limitations have occurred; and returning a response to the user request, responsive to determining the one or more security limitations have occurred, wherein the response is based on the evaluation by the policy evaluator and includes whether the user request is renderable.

2. The method of claim 1, wherein encrypting token metadata to form the encrypted token metadata further includes:

configuring the encrypted token metadata into a JSON web token (JWT token).

3. The method of claim 2, further comprising:

obtaining, by the policy evaluator, the JWT token.

4. The method of claim 1, wherein the policy evaluator stores the one or more encrypted policies generated by the policy creator.

5. The method of claim 1, wherein sending the one or more encrypted policies and the encrypted token metadata to the policy evaluator includes:

passing, by a resource server, the one or more encrypted policies and the encrypted token metadata to the policy evaluator.

6. The method of claim 5, further comprises:

determining an evaluation result, wherein the evaluation result is based on the evaluation of the one or more encrypted policies and the encrypted token metadata by the policy evaluator;

performing a decision based on the evaluation result, wherein the policy evaluator performs the decision;

forwarding the evaluation result to the resource server; and generating, via the resource server, the response, wherein the response is returned to the user by the resource server.

7. A system for preserving confidentiality of metadata in decentralized policies, the system comprising:

a memory; and a processor in communication with the memory, the processor being configured to perform operations comprising:

generating, via a processor, one or more encrypted policies associated with a policy creator;

generating token metadata associated with a user request utilizing the one or more encrypted policies;

encrypting the token metadata to form encrypted token metadata;

encrypting the token metadata to form encrypted token metadata;

sending the one or more encrypted policies and the encrypted token metadata to a policy evaluator, wherein the policy evaluator evaluates the one or more encrypted policies and the encrypted token metadata to determine an evaluation result, wherein the evaluation result is based on the evaluation of the one or more encrypted policies and the encrypted token metadata by the policy evaluator;

performing, responsive to determining an evaluation result, a decision based on the evaluation result;

determining one or more security limitations have occurred; and returning a response to the user request, responsive to determining the one or more security limitations have occurred, wherein the response is based on the evaluation by the policy evaluator and includes whether the user request is renderable.

8. The system of claim 7, wherein encrypting token metadata to form the encrypted token metadata further includes:

configuring the encrypted token metadata into a JSON web token (JWT token).

9. The system of claim 8, further comprising:

obtaining, by the policy evaluator, the JWT token.

10. The system of claim 7, wherein the policy evaluator stores the one or more encrypted policies generated by the policy creator.

11. The system of claim 7, wherein sending the one or more encrypted policies and the encrypted token metadata to the policy evaluator includes:

passing, by a resource server, the one or more encrypted policies and the encrypted token metadata to the policy evaluator.

12. The system of claim 11, further comprises:

determining an evaluation result, wherein the evaluation result is based on the evaluation of the one or more encrypted policies and the encrypted token metadata by the policy evaluator;

performing a decision based on the evaluation result, wherein the policy evaluator performs the decision;

forwarding the evaluation result to the resource server; and generating, via the resource server, the response, wherein the response is returned to the user by the resource server.

13. A computer program product for preserving confidentiality of metadata in decentralized policies, the computer program product comprising a computer readable storage medium having program instructions embodied therewith, the program instructions executable by a processor to cause the processors to perform a function, the function comprising:

generating, via a processor, one or more encrypted policies associated with a policy creator;

generating token metadata associated with a user request utilizing the one or more encrypted policies;

encrypting the token metadata to form encrypted token metadata;

encrypting the token metadata to form encrypted token metadata;

sending the one or more encrypted policies and the encrypted token metadata to a policy evaluator, wherein the policy evaluator evaluates the one or more encrypted policies and the encrypted token metadata to determine an evaluation result, wherein the evaluation result is based on the evaluation of the one or more encrypted policies and the encrypted token metadata by the policy evaluator;

performing, responsive to determining an evaluation result, a decision based on the evaluation result;

determining one or more security limitations have occurred; and returning a response to the user request, responsive to determining the one or more security limitations have occurred, wherein the response is based on the evaluation by the policy evaluator and includes whether the user request is renderable.

14. The computer program product of claim 13, wherein encrypting token metadata to form the encrypted token metadata further includes:
- configuring the encrypted token metadata into a JSON web token (JWT token).

15. The computer program product of claim 14, further comprising:
- obtaining, by the policy evaluator, the JWT token.

16. The computer program product of claim 13, wherein the policy evaluator stores the one or more encrypted policies generated by the policy creator.

17. The computer program product of claim 13, wherein sending the one or more encrypted policies and the encrypted token metadata to the policy evaluator includes:
- passing, by a resource server, the one or more encrypted policies and the encrypted token metadata to the policy evaluator.

* * * * *